United States Patent [19]

Minow

[11] Patent Number: 6,035,921

[45] Date of Patent: Mar. 14, 2000

[54] GATE CONTROL APPARATUS

[76] Inventor: Darrel J. Minow, HC 57, Box 4090-1, Sidney, Mont. 59720

[21] Appl. No.: 09/112,942

[22] Filed: Jul. 9, 1998

[51] Int. Cl.[7] .................................................. A47H 23/00
[52] U.S. Cl. .............................................. 160/328; 49/34
[58] Field of Search ..................................... 160/328, 327, 160/329, 405; 49/34, 49, 325, 331

[56] References Cited

U.S. PATENT DOCUMENTS

| | | | |
|---|---|---|---|
| 1,790,304 | 1/1931 | House ........................................... | 49/34 |
| 2,827,265 | 3/1958 | McKillop ............................. | 160/328 X |
| 3,667,729 | 6/1972 | Hinkel ................................. | 160/328 X |
| 3,799,595 | 3/1974 | Wahlert ............................... | 160/328 X |
| 4,333,268 | 6/1982 | Dumbeck ..................................... | 49/34 |
| 5,537,778 | 7/1996 | Bardwell et al. ........................... | 49/34 |
| 5,752,559 | 5/1998 | Minow ..................................... | 160/328 |
| 5,871,038 | 2/1999 | Gompertz et al. ....................... | 160/328 |

*Primary Examiner*—David M. Purol
*Attorney, Agent, or Firm*—David A. Lingbeck

[57] ABSTRACT

A gate control apparatus includes a gate support member, an arm pivotally mounted thereto and having gate members connected to the arm, a flexible line connected to the arm, a line takeup for carrying the flexible line, and an actuator for actuating the line takeup. The gate is opened and closed by the arm either being pivotally lowered to open the gate or pivotally raised to close the gate. A radio transmitter is used to send a signal to a radio receiver which energizes a motor to either rotate a shaft and spool one way or another which either takes up the flexible line to pivotally raise the arm which closes the gate or lets out the flexible line to pivotally lower the arm which opens the gate. The user can operate this gate control apparatus without ever having to leave one's vehicle.

11 Claims, 4 Drawing Sheets

GATE CONTROL APPARATUS

BACKGROUND OF THE INVENTION

This invention relates to a gate control apparatus which allows the user to open and close gates, in particular wire gates, without the user ever having to do so manually or physically.

Wire gates generally comprise separate wires fixedly attached to a first corner post aligned with the fence line, the separate wires having ends which are wrapped around or fastened with U-shaped nails to the first corner post, the separate wires being spaced along the length or height of the corner posts which is disposed upright. The other ends of the separate wires are wrapped around or nailed to a support post, the separate wires being generally parallel to each other. To close the wire gate, the user positions the support post upright next to a second corner post separated from the first corner post with the space in between being the passage through the fence, and is securely held in place with a wire loop which is placed over the top ends of both the support post and the second corner post. The separate wires extending between the two corner posts form the gate through which the user uses to pass through the fence. To open the wire gate, the user lifts the wire loop off the support post and either lets the support post and separate wire drop to the ground or moves the supports post and separate wires away from the passage and then lets down the support post and separate wires to the ground.

Wire gates are not like gates made of iron or steel where in order to open or close them, the user needs to only swing the gates about their pivots. Instead of the user having to physically open and close the wire gate by hand, the present invention allows the user to remotely open and close the wire gate.

SUMMARY OF THE INVENTION

The present invention relates to a gate control apparatus comprising an arm pivotally mounted at one end thereof to an arm mounting member or bracket member which is securely mounted near a bottom of a gate support member which, in turn, is securely mounted to a fence support member, and further comprising arm support members which are securely mounted to the gate support member and spaced apart to receive the arm therebetween when the gate is closed to substantially hold the arm so that it won't bend over if livestock lean up against it. The gate control apparatus also includes a conical-shaped spool which is mounted about a shaft and which includes a plurality of helical ribs disposed thereabout, the shaft being journaled through a pair of shaft support members or bracket members and also being connected to a motor which is energized by a battery and radio receiver and transmitter. A flexible line is connected to the top of the arm and is carried about the spool and is used to lift and lower the arm to open and close the gate.

One objective of the present invention is to provide a gate control apparatus which easily and conveniently opens and closes a gate automatically without the user having to physically open and close the gate.

Another objective of the present invention is to provide a gate control apparatus which allows the user to open and close the gate without having to alight from the prime mover or vehicle. This is especially important during the cold winter months.

Yet, another objective of the present invention is to provide a gate control apparatus which opens and closes a gate without the wires forming the gate become entangled, a problem if for the user who physically opens and closes the gate.

Further objectives and advantages of the present invention will become apparent as the description proceeds and when taken in conjunction with the accompanying drawings wherein:

DETAILED DESCRIPTION OF THE INVENTION

Figure 1:
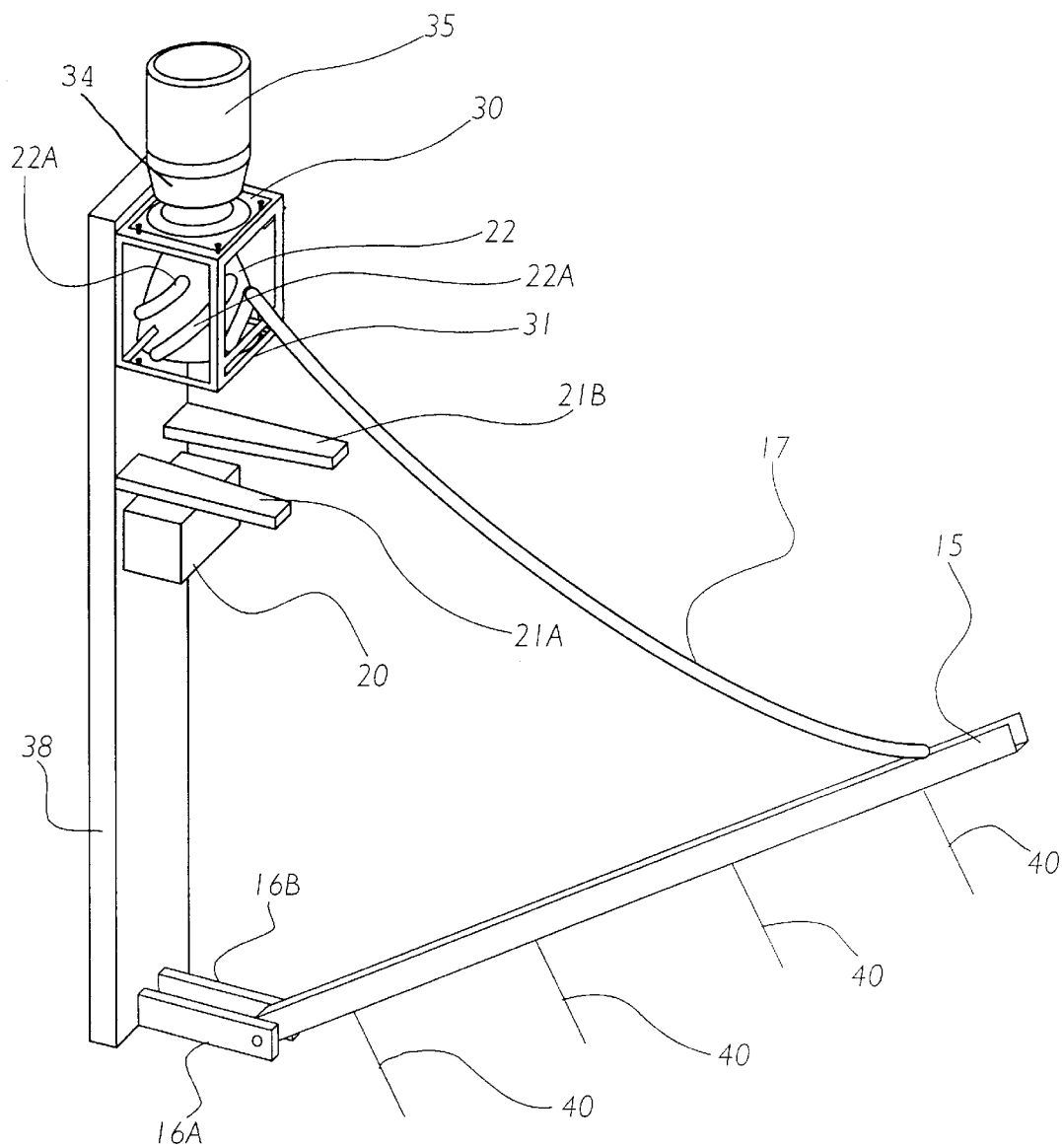
FIG. 1 is a top perspective view of the gate control apparatus with the arm being lowered to open the gate.

Referring to the drawings in FIGS. 1–4, in particular, the gate control apparatus comprises an arm 15 having a bottom end which is pivotally mounted to arm mounting members 16A–B which includes a mounting bracket having a pair of spaced apart elongate members with the bottom end of the arm 15 being received therebetween and pivotally mounted with conventional means. The arm mounting members 16A–B are securely mounted with conventional means to near a bottom end of an elongate gate support member 36 which is securely mounted with conventional means to and extends along the length of a fence support member 38 such as a fence post which has a bottom portion submerged in the ground. Arm support members 21A–B are securely attached with conventional means such as with bolts or being welded to a side and between the top and center of the gate support member 36. The arm support members 21A–B include a pair of spaced-apart elongate members having ends securely mounted to the side of the gate support member 36. In a closed position, the arm 15 is received between the spaced-apart elongate members and is prevented from pivoting forwards and backwards and being broken off especially if the livestock pushes and leans against the gate as they commonly do when trying to feed along the fence line.

Figure 2:
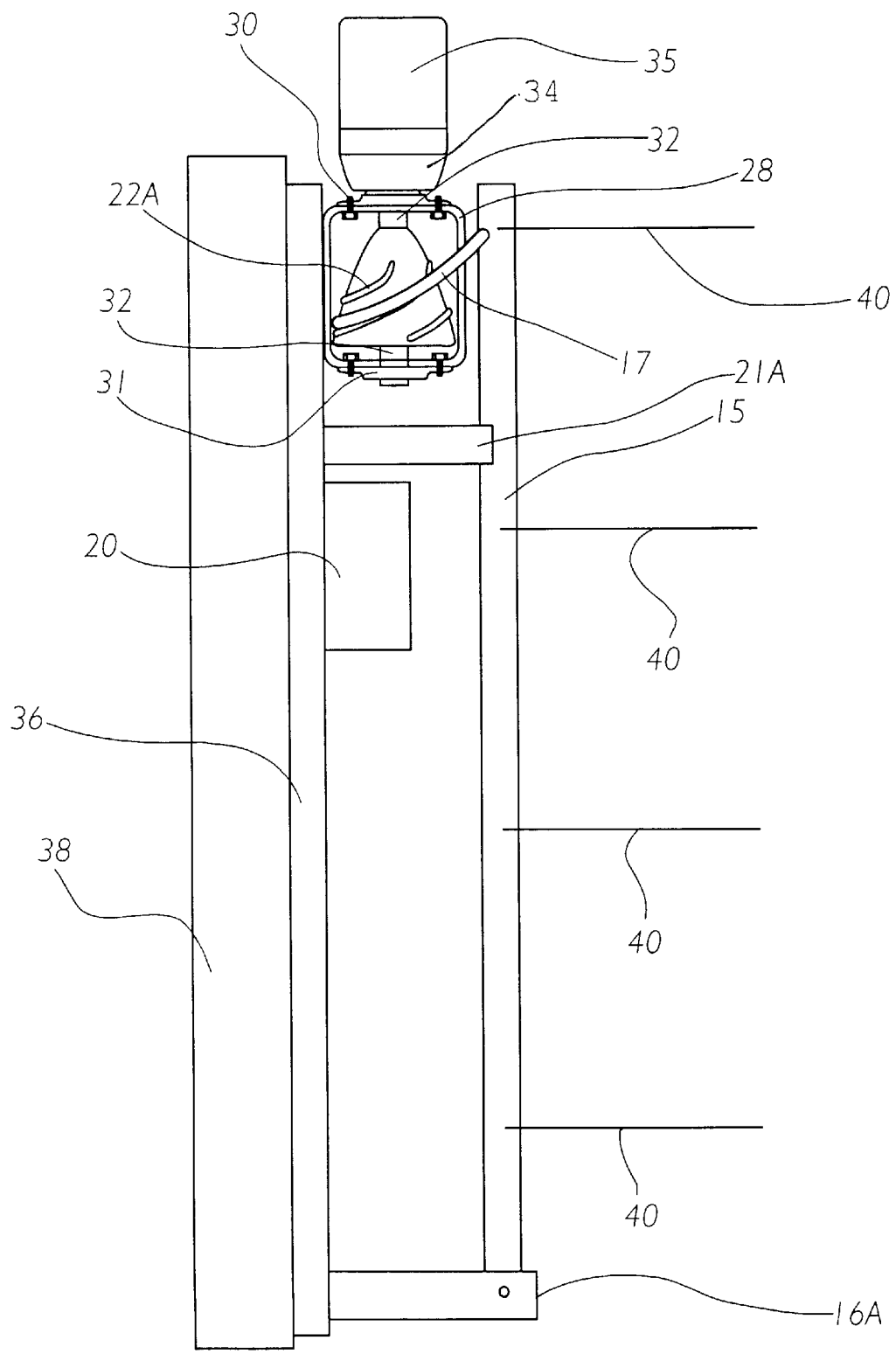
FIG. 2 is a front elevational view of the gate control apparatus attached to a corner post with wires being attached to the arm which is raised in a closed position.
Figure 3:
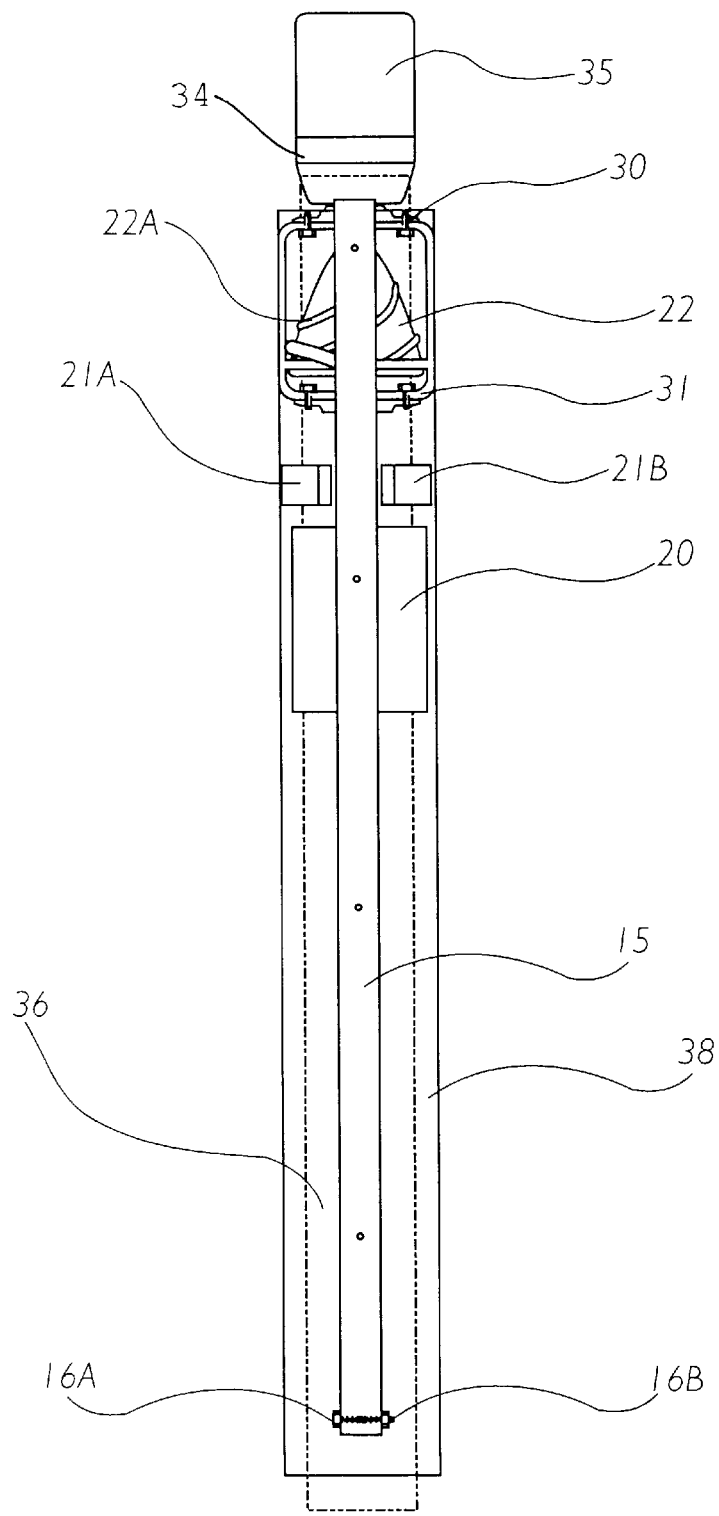
FIG. 3 is a side elevational view of the gate control apparatus attached to a corner post with the arm being a raised closed position.
Figure 4:
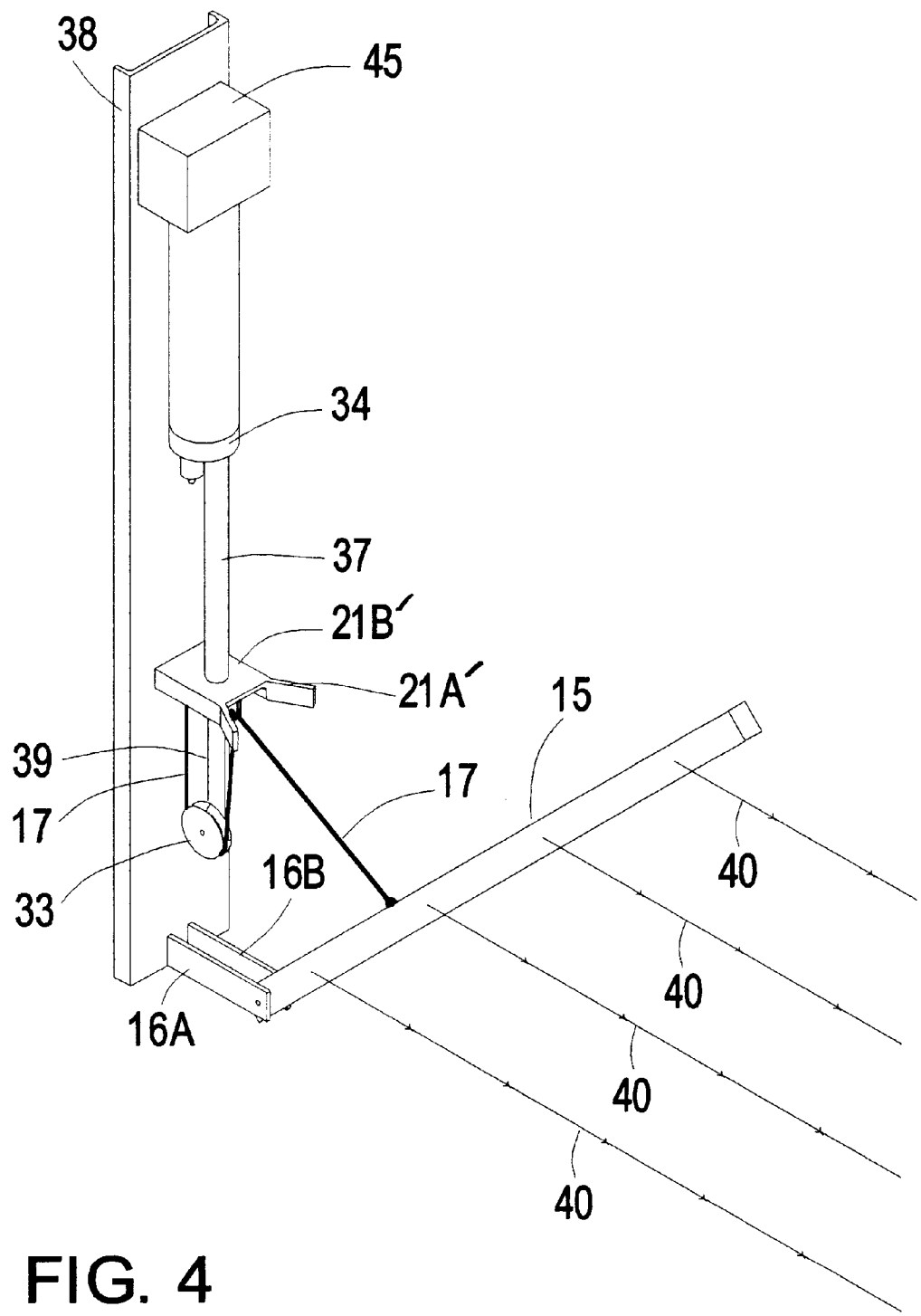
FIG. 4 is a perspective view of another embodiment of the gate control apparatus.

As illustrated in FIGS. 1–3, the gate control apparatus further includes a flexible line 17 such as a cable, having one end connected with conventional means to near the top end of the arm 15 and being carried about a line take-up means which includes a spool 22 essentially being conically shaped so as to distribute the flexible line 17 along and about the spool 22 as the line is being taken up. The line take-up means further includes a rotatable shaft 32 about which the spool 22 is mounted. The shaft 32 has a bottom end which is journaled through a first shaft support member 31 which is conventionally mounted and extends outwardly from near the top end of the side of the gate support member 36, and has a top end which is journaled through a second shaft support member 30 which is conventionally mounted and extends outwardly near the top end of the side of the gate support member 36 and is spaced from the first shaft support member 31. Both the first and second shaft support members 30,31 are essentially planar members which extend perpendicular to the gate support member 36 and which are interconnected with a plurality of brace members 28 for added strength and stability. The rotatable shaft 32 is actuated by an actuating means which includes a motor 34 which is disposed above the second shaft support member 30 and is conventionally connected to the shaft 32. The motor 34 is conventionally connected to and energized by a battery 20 which is securely mounted to the gate support member 36 as illustrated in FIG. 1. A radio receiver 35 interconnects the battery 20 to the motor 34 and functions as a switch for energizing the motor 34 which, when energized, rotates the rotatable shaft 32 in one direction to take up the flexible line 17 about the spool 22 and also can be reversed to rotate the spool 22 in the opposite direction to let out the flexible line 17 from about the spool 22. A conventional remote radio transmitter which can be carried by the user is needed to send a radio signal to the radio receiver 35. Depending upon the signal sent, the radio receiver 35 energizes the motor 34 which rotates the spool 22. As shown in FIG. 4, another embodiment of the line take-up means includes a linear actuator securely mounted to the gate support member 36 and comprising a motor 34, an elongate housing 37 connected to the motor 34 and extending downwardly therefrom and being supported by the housing support members 21A'-B' which are mounted to the gate support member 36, a shaft 39 movable within the elongate housing 37, a pulley 33 conventionally attached to an end of the shaft 39 and a flexible line 17 carried about the pulley 33 and having ends connected to the gate support member 36 and to the arm 15, and a power source 45 comprising electricity and switches connected to the motor 34 for the energizing thereof.

To open and close the gate, the user uses the radio transmitter to send a signal to the radio receiver 35 securely disposed upon the gate support member 36. If the user wants to open the gate, the user actuates a conventional switch on the radio transmitter and a radio signal is transmitted to the radio receiver 35 which energizes the motor 34 which, in turn, rotates the shaft 32 and the spool 22 in the direction that lets out the flexible line 17 from about the spool 22. The arm 15 which is in an upright closed position and which is received between the pair of arm support members 21A–B is lowered at an angle of approximately 45 degrees relative to the line of the gate when closed so that the gate member 40 or wires attached to the arm 15 do not become entangled when the arm 15 is lowered to the ground to allow passage through the gate. Then, if the user wants to close the gate, the user actuates another switch on the radio transmitter which sends a radio signal to the radio receiver 35 which energizes the motor 34 which, in turn, rotates the shaft 32 and the spool 22 in the direction that takes up the flexible line 17 about the spool 22. The helical ribs 22A fixedly disposed about the surface of the spool 22 facilitates the distribution of the flexible line 17 about the spool 22 so that the flexible line 17 doesn't get bunched up about the spool 22. As the flexible line 17 is taken up about the spool 22, the arm 15 is lifted to an upright position with the wires of the gate being stretched across the gate line to close the gate. The arm 15 is received between the arm support members 21A–B to prevent livestock from bending or pivoting the arm 15 if they should lean or press against the arm 15. The user can easily and conveniently activate the opening and closing of the gate right from one's own vehicle unlike any other types of gate opening and closing means.

Various changes and departures may be made to the invention without departing from the spirit and scope thereof. Accordingly, it is not intended that the invention be limited to that specifically described in the specification or as illustrated in the drawings but only as set forth in the claims.

What is claimed is:

1. A gate control apparatus comprising:

a gate support member;

an arm pivotally mounted upon said gate support member and having gate members connected thereto;

at least one arm mounting member which is securely mounted to said gate support member, said arm being pivotally mounted to said arm mounting member;

a flexible line connected to said arm;

a line take-up means for carrying said flexible line thereabout and for closing a gate and allowing the gate to be opened; and a means for actuating said line take-up means.

2. A gate control apparatus as described in claim 1, wherein said arm is disposed upon said gate support member such that said arm opens at approximately 45 degrees relative to a gate line to substantially prevent entanglement of the gate members.

3. A gate control apparatus as described in claim 2, wherein when the gate is closed, said arm is in a substantially upright position and when the gate is opened, said arm is pivotally lowered to a ground.

4. A gate control apparatus as described in claim 3 further includes arm support members which are securely mounted to said gate support member and spaced thereapart to receive a portion of said arm therebetween when the gate is closed to substantially stabilize said arm and to substantially prevent lateral bending of said arm.

5. A gate control apparatus as described in claim 4, wherein said arm support members extend outwardly from said gate support member and are securely mounted upon said gate support member to receive a top portion of said arm therebetween.

6. A gate control apparatus as described in claim 1, wherein said means for actuating said line take-up means includes a motor connected to said shaft for rotation thereof, a radio receiver for receiving remote radio signals from a radio transmitter and for energizing said motor, and a battery for supplying energy to said motor.

7. A gate control apparatus comprising:

a gate support member;

an arm pivotally mounted upon said gate support member and having gate members connected thereto;

a flexible line connected to said arm;

a line take-up means for carrying said flexible line thereabout and for closing a gate and allowing the gate to be opened, said line take-up means includes a rotatable shaft being journaled through at least one shaft support member which is securely mounted to said gate support member, and further includes a spool being mounted about said shaft for rotation therewith, said spool being essentially conically shaped to facilitate takeup of said flexible line which is carried thereabout without bunching of said flexible line; and a means for actuating said line take-up means.

8. A gate control apparatus as described in claim 7, wherein said conically-shaped spool further includes ribs circumferentially disposed thereabout to facilitate distribution and takeup of said flexible line.

9. A gate control apparatus as described in claim 8, wherein said ribs are helically disposed about said spool.

10. A method of closing and opening a gate includes the steps of:

providing a gate support member, an arm pivotally mounted upon said gate support member and having gate members connected thereto, a flexible line connected to said arm, a line take-up means for carrying said flexible line, and a means to actuate said line take-up means;

pivotally lifting said arm off a ground to a substantially upright position to close the gate by actuating said line take-up means which takes up said flexible line thereabout thus pivotally lifting said arm and by sending a radio signal to a radio receiver which energizes a motor which rotates a shaft and spool which takes up said flexible line; and pivotally lowering said arm to the ground to open the gate.

11. A means of closing and opening a gate as described in claim 10, wherein the step of actuating said line take-up means includes sending a radio signal to a radio receiver which energizes a motor which rotates a shaft and spool which lets out said flexible line from thereabout.

* * * * *